Aug. 20, 1935.  H. C. GARRETT  2,011,811
LUBRICANT HEATING MEANS
Filed March 21, 1930
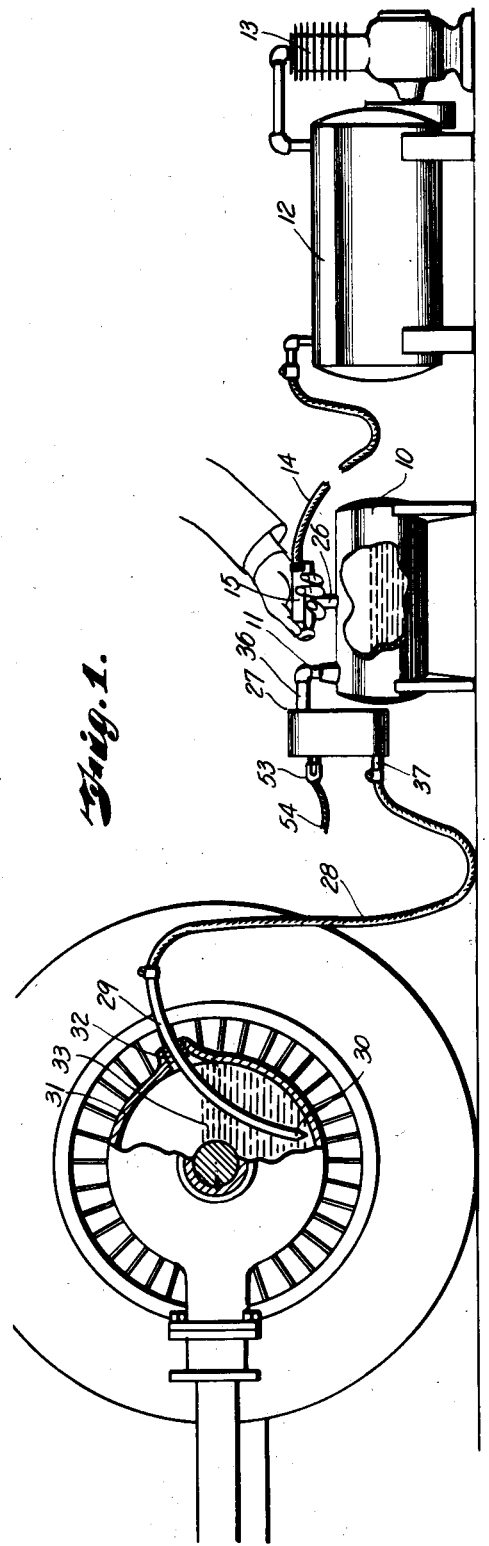
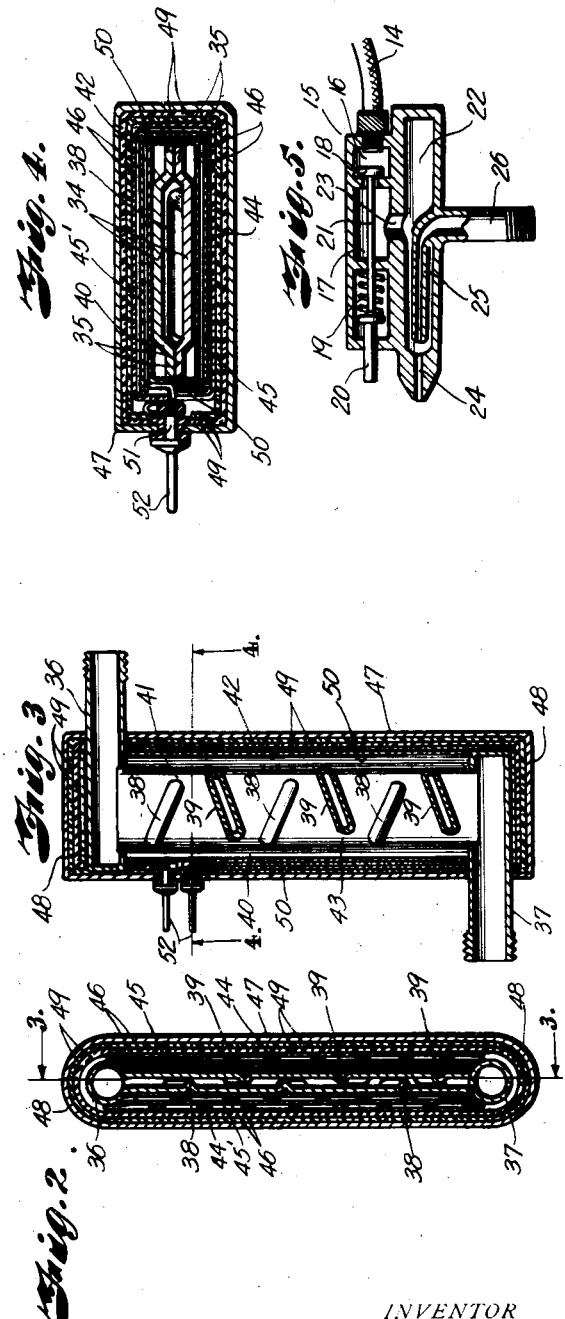
INVENTOR
Hugh C. Garrett
BY Alfred R. Fuchs
ATTORNEY Patented Aug. 20, 1935

2,011,811

UNITED STATES PATENT OFFICE 2,011,811

LUBRICANT HEATING MEANS

Hugh C. Garrett, Kansas City, Mo., assignor to Fre-Flo Co., Kansas City, Mo., a copartnership composed of W. W. Harrington, Q. C. King, H. B. Lawson, J. W. Boisseau, and H. C. Garrett Application March 21, 1930, Serial No. 437,840

7 Claims. (Cl. 219—39)

My invention relates to lubricant heating means and more particularly to electric heating means for this purpose.

It is a purpose of my invention to provide means for heating a lubricant such as the grease in a casing or housing, such as the differential housing of an automobile, by means of a liquid that is heated and in its heated condition is brought in contact with the grease. In automobiles and similar devices it is very difficult to remove the grease from a gear casing or similar device in cold weather, particularly where the grease that is in the housing is of a character such that the same hardens materially under low temperatures. Devices that have been made for this purpose either use a liquid that is supposed to dissolve the grease without heating the liquid, or devices in which heated air is applied to the contents of the housing or a torch or other heating device is applied externally to the housing. All these various means do not successfully remove the hardened grease with any speed, and my invention contemplates an apparatus and a method of removing the grease that is rapid and efficient, and which is simple and compact.

My apparatus comprises preferably an electric heating device that is inserted between a container for the liquid used to dissolve the grease, and the discharge end of the conduit used for supplying the solvent liquid to the gear or similar casing containing the grease. Any means may be used for applying pressure or suction to the container that contains the liquid for dissolving the grease, and one form of such apparatus is shown and described.

It is a purpose of my invention to provide a method to remove the grease, that is hardened, from a gear casing, by first drawing the solvent liquid from any suitable container into the tank or reservoir in which it is placed for the purpose of carrying out the method, and heating the same by means of my improved heating device as it passes toward said reservoir, this being accomplished by applying suction to the reservoir. After all of the solvent liquid desired is placed in the reservoir, the discharge end of the conduit from the reservoir is placed in the gear casing and pressure is applied to the reservoir to pass the liquid toward the gear casing, and this liquid is again heated as it passes through the electrical heating device on its way to the discharge end of the conduit, and it is heated sufficiently when entering the gear casing to warm the grease therein so that the same will be dissolved by the liquid solvent material. Suction is then again applied to the reservoir to remove the solvent and the dissolved grease from the gear casing, and it is heated in transit to the reservoir again by the electrical heating device. Pressure and suction is then alternately applied to the device to alternately force the solvent liquid into and withdraw it from the gear casing until all the grease has been dissolved, and is in the reservoir along with the solvent. The solvent can then be withdrawn from the reservoir along with the grease and the device used over again.

Other objects and advantages of my invention will appear as the description of the drawing proceeds. I desire to have it understood, however, that I do not intend to limit myself to the particular details shown or described herein, but that I intend to include as part of my invention all such obvious changes and modifications as would occur to a person skilled in this art and as would fall within the scope of the claims.

In the drawing:

Fig. 1 is a side elevation, partly broken away, of my improved apparatus, as used in conjunction with apparatus for removing grease from a differential housing.

Fig. 2 is a transverse section taken substantially on the line 2—2 of Fig. 1 through my improved device.

Fig. 3 is a section taken on the line 3—3 of Fig. 2.

Fig. 4 is a section taken substantially on the line 4—4 of Fig. 3, and

Fig. 5 is a longitudinal section taken through the pressure and suction controlling device.

Referring in detail to the drawing, my improved grease removing apparatus is shown generally in Fig. 1, in which the apparatus is shown as being in the act of being used for removing grease from the differential housing of an automobile, although, obviously, the device can be used for removal of grease from any gear housing or similar casing. The apparatus shown in Fig. 1 comprises a gear flushing apparatus including a reservoir or tank 10, which is provided with a conduit 11 extending therefrom through which a solvent liquid for the grease may be drawn into or discharged from the reservoir 10. This drawing in or discharge of the liquid from the reservoir 10 is accomplished preferably by means to create pressure in the tank 10 or create suction therein.

The means for obtaining pressure and suction in the reservoir 10 may be of any desired character, and one form of well known apparatus for this purpose is shown. This well known apparatus comprises an air pressure tank 12, to which air under pressure is supplied by means of the compressor 13, and to which tank 12, the hose or air conduit 14 is connected. A controlling device 15, which is hand operated, as will be evident from Fig. 1, connects the air conduit 14 with the top portion of the reservoir 10. The controlling device is shown more in detail in Fig. 5, and comprises an inlet chamber 16 with which the compressed air conduit 14 is connected. The chamber 16 is adapted to be connected with the chamber 17 to communicate therewith by means of a valve 18, which is seated by a spring 19, and which may be unseated by inward pressure on the finger piece 20, pushing against the valve stem 21. A lower chamber 22 in the device 15 is connected with the casing 17 by a passage 23, and has a discharge orifice 24, whereby, when said orifice is open to discharge the air therethrough, suction is created in the suction nozzle 25, which has a suction conduit 26 leading into the top of the reservoir. When the finger of the operator is removed from the end of the nozzle 24, suction will be created in the suction pipe 26, but when the finger is placed thereon, as shown in Fig. 1, the air under pressure will enter through the nozzle 25 and flow into the pipe 26 connected with the reservoir 10. Thus, when the finger of the operator is removed from the end of the outlet or orifice 24, suction will be created in the reservoir 10, while, if it is placed firmly in position on the end thereof, pressure will be created in the reservoir 10.

The apparatus shown in Fig. 1, further comprises the heating device 27, the construction of which will be explained more in detail below, the flexible conduit 28 and the tool 29 having a nozzle 30 at the extreme end thereof. The tool 29 is a tubular member that is curved so that it will reach readily into the bottom-most portion of the differential housing 31 when inserted through an opening 32 provided therein, the differential housing 31 being of any usual type provided on an automobile or similar device, the differential housing being shown merely for purposes of illustration, as any other gear housing or similar casing for grease can be cleaned in the same manner as the differential housing. The grease is indicated therein by the numeral 33.

The heater 27 comprises an inner liquid receiving portion that comprises a thin flat body portion made up of a pair of metallic members 34, such as aluminum, which may be provided with flanges 35 that are welded or otherwise secured together in liquid tight relation. The body portion has tubular members 36 and 37 extending from opposite ends thereof, which are secured to said body portion in liquid tight relation thereto, and which communicate therewith, the tubular member 36 being connected with the conduit 11 by any suitable pipe connections. The body portion of the device has the flat walls of the members 34 thereof provided with inwardly struck ribs 38 and 39, the ribs 38 being inclined in one direction and the ribs 39 in the opposite direction. The ribs 38 lie adjacent one of the vertical end walls 40 of the thin flat body portion, and are spaced, as indicated at 41, from the opposite vertical end wall 42 of said body portion, while the ribs 39 lie closely adjacent the wall 42 and are spaced from the wall 40 as indicated at 43.

It will be noted that the ribs 38 extend substantially to the flat wall portion opposite the same, and the ribs 39 extend substantially to the flat wall portion opposite said ribs 39. A circuitous passage is thus formed through the body portion of the inner liquid receiving portion of the device and as the tubular member 37 is always placed downwardly, it will be seen that the liquid will drain by gravity from the thin flat liquid receiving portion out through the tubular member 37 when it is desired to drain the device of the liquid. It will also be noted that a large surface of the liquid, in passing through the device between the members 34, will come in contact with the flat walls, and will follow a relatively long path through the device.

The liquid in this circuitous passage thus provided is heated by electrical means comprising a heating element made up of flat portions lying on opposite sides of the flat wall portions of the members 34, and electrically insulated therefrom. Preferably the heating element comprises a flat strip of resistance wire 44, which is wound spirally around a flat piece of mica or other insulating material 45, and spirally around a similar flat piece of mica 45' on the opposite side of the liquid containing portion from the sheet 45. The resistance wire 44 thus connects the two windings provided on each side of the device in series. Sheets of insulating material, such as the sheets of mica 46, are placed on each side of the sheets 45 and 45'. A flat heating element made up of a spirally wound flat coil of flat resistance wire, and sheets of mica or other electrical insulating material within the spiral winding and on opposite sides thereof, is thus provided on each side of the liquid receiving flat thin body portion of the device, the heating element lying flatly against the flat faces of the liquid receiving body portion.

The device is further provided with an outer casing, made of any suitable metal, indicated by the numeral 47, which may be made of any desired shape, but is shown as being substantially rectangular with rounded ends 48. Suitable heat insulating material, such as the layers of asbestos 49, is provided between the outer metallic casing 47 and the heating element, the same being provided between all of the outer walls of the device and the inner liquid heating means. Layers of mica 50 are also provided between the thin vertical edges of the inner liquid receiving body portion and the resistance element, and also preferably between the resistance element and the asbestos layers provided along the narrow edges of the device.

The opposite ends of the resistance wire 44 are connected with the terminals 51, which are mounted in a well known manner in the casing 47 so as to be electrically insulated therefrom, and being provided with projecting terminals or prongs 52, with which may be connected the usual well known type of plug 53, having the electrical cord 54 connected therewith.

It will be seen that when the plug 53 is connected with the prongs 52 the resistance wire 44 will become heated and being in close relationship to, and covering a large area closely adjacent to, the flat walls on the members 34 forming the liquid receiving body portion of the device, the flat walls will be heated to a high temperature and any liquid within the same will be heated rapidly.

In operation, the solvent liquid to be used for dissolving the grease is drawn into the reservoir 10 by removing the finger from the nozzle 24 causing suction in the reservoir 10, which will draw the liquid for dissolving the grease in through the tubular member 26 and the heating device 27 to the tank or reservoir 10. The liquid used as a solvent will pass into the heater through the tubular member 37, and upwardly through the thin flat body portion, following the circuitous passage provided therein upwardly until the same passes out through the tubular member 36, and on into the reservoir 10. The liquid passing through the heater 27 will thus come into contact with the heated walls thereof as it follows the circuitous passage through the heater, and will be warmed when it reaches the reservoir 10.

The tool 29 is then inserted into the casing from which the grease is to be removed, such as the differential housing 31, and the controlling device will be reversed by placing the finger over the nozzle 24 creating pressure in the tank 10, and causing the liquid within the reservoir 10 to be forced again through the heater 27 in a reverse direction, that is, entering through the tubular member 36 flowing downwardly through the thin flat body portion of the device and outwardly through the tubular member 37, and will enter the casing 31 through the conduit 28 and the tool 29. It is, of course, understood that the operator uses the thumb or some other finger for pressing the finger piece 20 inwardly, during all the time that either pressure or suction is desired in the reservoir 10 to connect the air supply from the hose 14 therewith.

The solvent liquid having been forced into the gear casing, the controlling device 15 is again operated to reverse the flow of the liquid through the device and the liquid flows from the gear casing 31 through the conduit 28, and through the heater 27 to the reservoir 10, the liquid being heated as it passes through the heater 27. The dissolved grease is drawn into the reservoir 10 along with the solvent liquid in doing this. When all of the liquid has been withdrawn from the gear casing 31, the controlling member 15 is again operated to reverse the flow of liquid from the reservoir 10, through the heater 27 into the gear casing 31. This operation of the controlling member 15 will cause the liquid to flow alternately in opposite directions between the gear casing, that is to have the grease removed therefrom, and the reservoir 10 and is continued until all the grease is removed. The liquid is heated each time it passes through the heater 27, and will be kept at a high temperature so that the grease in the casing or housing 31, or any other similar gear casing or housing, will be all dissolved and withdrawn due to the fact that the grease will also be heated to a high temperature, because of coming into intimate contact with the hot liquid that has been heated to a high temperature by its repeated flowing through the heater 27.

Having thus described my invention what I claim and desire to secure by United States Letters Patent is:

1. In apparatus of the character described, a liquid reservoir, means for creating either pressure or suction in said reservoir, a tool adapted to be inserted in a gear casing and conduit means connecting said reservoir with said tool comprising a liquid heater.

2. In apparatus of the character described, a liquid reservoir, means for creating either pressure or suction in said reservoir, a tool adapted to be inserted in a gear casing and conduit means connecting said reservoir with said tool comprising a liquid heater comprising a liquid receiving portion forming part of said conduit and electric heating means arranged externally of but closely adjacent said liquid receiving portion.

3. In apparatus of the character described, a liquid reservoir, means for creating either pressure or suction in said reservoir, a tool adapted to be inserted in a gear casing and connected with said reservoir means for controlling said suction and pressure creating means so that liquid may be either discharged from said reservoir or drawn into said reservoir through said tool, and means for heating said liquid comprising a liquid receiving body portion, and electric heating means externally of but closely adjacent the walls of body portion.

4. In apparatus of the character described, a liquid reservoir, means for creating either pressure or suction in said reservoir, a tool adapted to be inserted in a gear casing and connected with said reservoir means for controlling said suction and pressure creating means so that liquid may be either discharged from said reservoir or drawn into said reservoir through said tool, and means for heating said liquid comprising a thin flat liquid receiving portion, spaced inlet and outlet connections on said liquid receiving portion and electric heating means lying externally closely adjacent the flat sides of said liquid receiving portion.

5. In apparatus of the character described, a liquid reservoir, means for creating either pressure or suction in said reservoir, a tool adapted to be inserted in a gear casing and connected with said reservoir means for controlling said suction and pressure creating means so that liquid may be either discharged from said reservoir or drawn into said reservoir through said tool, and means for heating said liquid comprising a thin flat liquid receiving portion, spaced inlet and outlet connections on said liquid receiving portion and electric heating means comprising thin flat resistance elements lying externally closely adjacent the flat sides of said liquid receiving portion.

6. The method of removing grease from a gear casing comprising the introduction of a liquid solvent into said casing in intimate contact with said grease, heating said solvent in transit to said casing, withdrawing the solvent and the dissolved grease from said casing into a reservoir and heating said solvent in transit to said reservoir.

7. The method of removing grease from a gear casing comprising alternately passing a liquid solvent from a reservoir into said gear casing into intimate contact with said grease and from said casing into said reservoir, and heating said solvent each time while being passed from said reservoir to said casing and from said casing to said reservoir.

HUGH C. GARRETT.